(12) United States Patent
Pope et al.

(10) Patent No.: US 7,735,810 B2
(45) Date of Patent: Jun. 15, 2010

(54) VEHICLE DOOR STRUT SUPPORT

(76) Inventors: William Pope, 2186 S. Cr. 50 East, Connersville, IN (US) 47331; David M. Day, 2119 Treatyline Rd., Cambridge City, IN (US) 47327

( * ) Notice: Subject to any disclaimer, the term of this patent is extended or adjusted under 35 U.S.C. 154(b) by 0 days.

(21) Appl. No.: 11/841,317

(22) Filed: Aug. 20, 2007

(65) Prior Publication Data
US 2008/0048082 A1    Feb. 28, 2008

Related U.S. Application Data

(60) Provisional application No. 60/823,389, filed on Aug. 24, 2006.

(51) Int. Cl.
*F16F 5/00* (2006.01)
(52) U.S. Cl. .................... 267/64.12; 188/300
(58) Field of Classification Search .......... 188/300; 267/64.12, 120
See application file for complete search history.

(56) References Cited

U.S. PATENT DOCUMENTS

| | | | | |
|---|---|---|---|---|
| 3,177,980 A | * | 4/1965 | Porter | 188/300 |
| 3,528,532 A | * | 9/1970 | Moskow | 188/300 |
| 4,078,779 A | * | 3/1978 | Molders | 267/120 |
| 4,824,082 A | * | 4/1989 | Schaupp | 267/120 |
| 5,358,225 A | * | 10/1994 | Volpel et al. | 267/64.12 |
| 5,529,148 A | * | 6/1996 | O'Leary | 188/67 |
| 5,579,875 A | * | 12/1996 | Vargas et al. | 188/300 |
| 5,791,445 A | * | 8/1998 | Kaufmann et al. | 188/322.12 |
| 6,273,405 B2 | * | 8/2001 | Okamoto | 267/64.12 |
| 6,601,834 B2 | * | 8/2003 | Perry | 267/64.12 |
| 6,634,627 B1 | * | 10/2003 | Stevenson | 267/64.12 |
| 7,219,780 B2 | * | 5/2007 | Thurmann et al. | 188/322.17 |

\* cited by examiner

*Primary Examiner*—Christopher P Schwartz
(74) *Attorney, Agent, or Firm*—Overhauser & Lindman, LLC

(57) ABSTRACT

A support for a gas prop (hydraulic strut) for a vehicle access door includes an elongate sleeve that is positionable around the cylinder and rod of the gas prop. The support secures a weak or otherwise defective gas prop in its position in which the vehicle access door is held open. The elongate sleeve includes a first and second end. The first end of the elongate sleeve is adapted to be selectively positioned between: (1) abutting the distal end of the cylinder, and (2) coaxially receiving at least a portion of the length of the cylinder. One or more slots are defined at the second end of the elongate sleeve. Each of the slots is selectively engageable with the shaft or post of an attachment bracket for coupling the rod end to the vehicle. Additionally, each one of the slots is a different length, thereby accommodating various lengths of gas props.

15 Claims, 5 Drawing Sheets

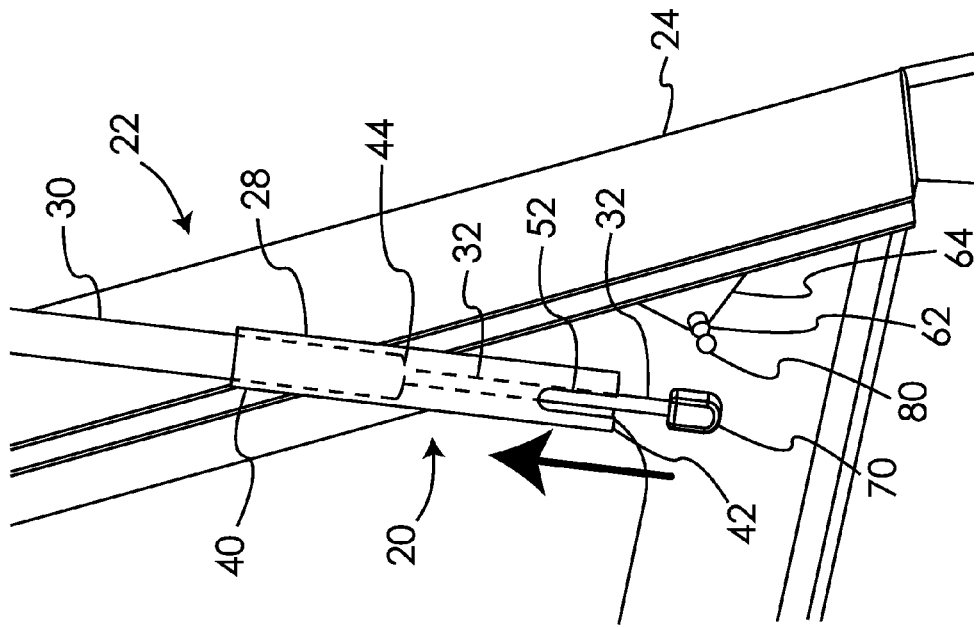
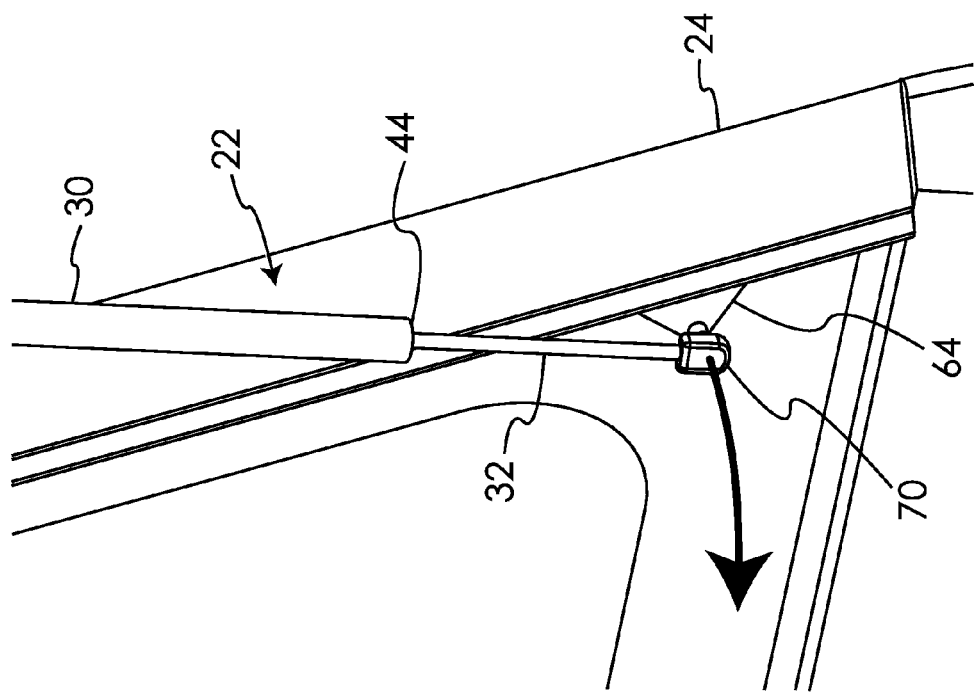

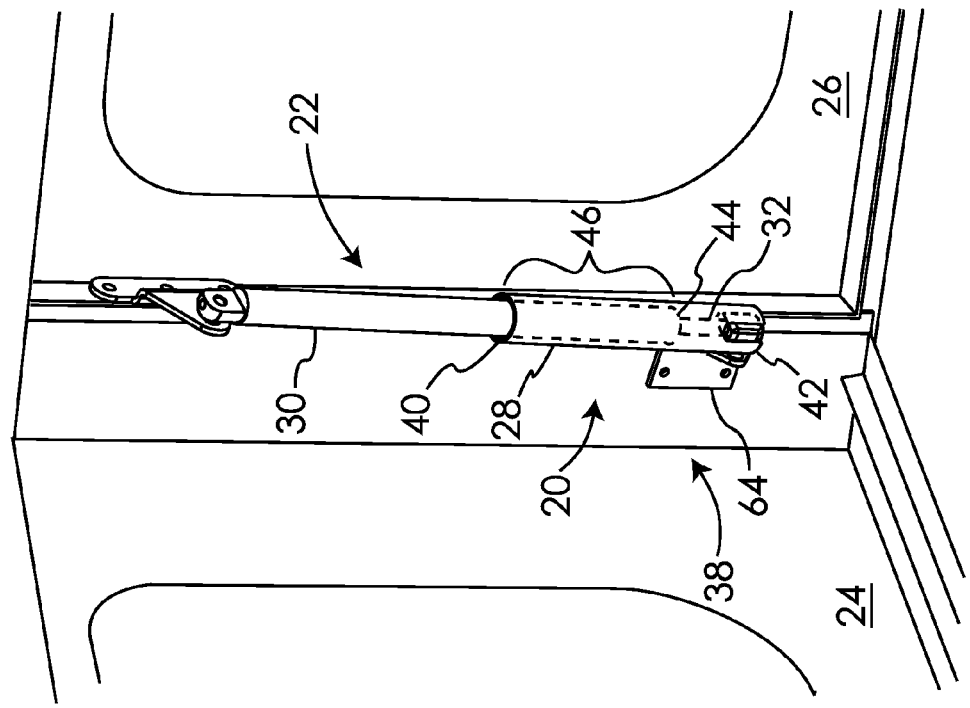
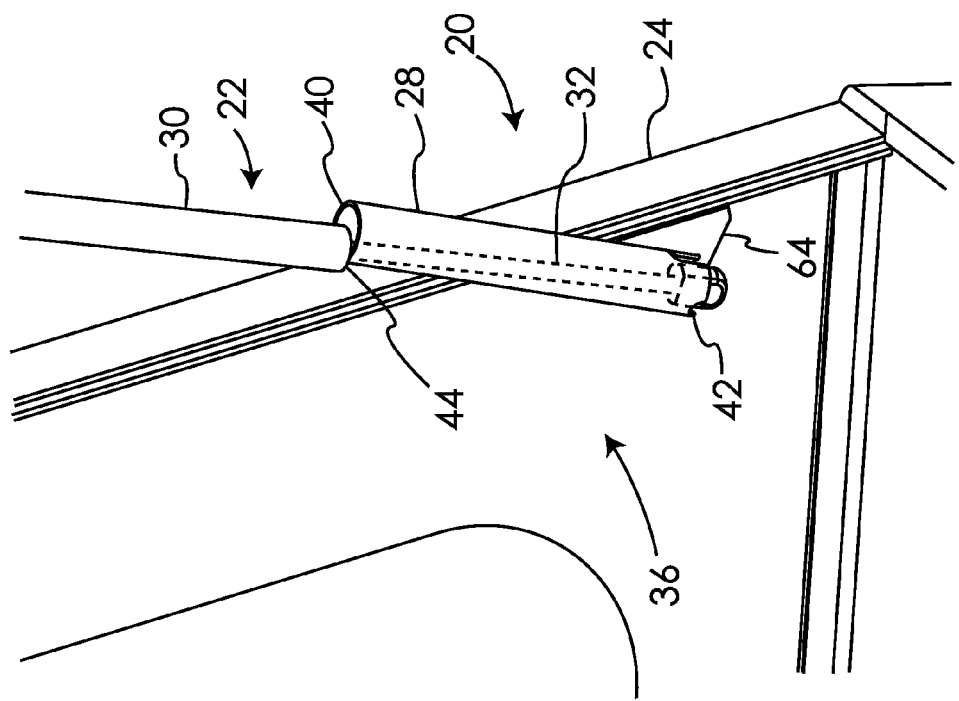

VEHICLE DOOR STRUT SUPPORT

CROSS-REFERENCE TO RELATED APPLICATIONS

This application claims the benefit of U.S. Provisional Patent Application No. 60/823,389, filed Aug. 24, 2006, and titled VEHICLE DOOR STRUT SUPPORT, which is incorporated herein by reference.

BACKGROUND

The present invention relates to gas struts or gas props such as those used to support a vehicle access door in an open position, and particularly, to a support for securing a weak gas prop in its position in which the vehicle access door is held open.

Many vehicles are provided with access doors such as a hood, passenger door, hatchback, or truck bed topper door which is raised or otherwise opened to provide access to the engine compartment, truck bed, or interior of the vehicle. Some of these vehicles access doors are also equipped with a hydraulic cylinder and rod combination, known as a gas prop or strut, that is designed to hold the access door in its fully open position. Specifically, these gas props are intended to provide sufficient resistance to the weight of the access door to prevent gravity from allowing the access door to drop or otherwise close; however, this resistance can be overcome by manually applying additional force to the access door to thereby close it.

The hydraulic cylinders in such gas props tend to become defective over time, which causes them to fail to support the access door in an open position for a prolonged or for any period of time. In the most severe instances of such failures, the gas prop may hold the access door open at first, but then when a person is positioned underneath the access door, the cylinder may fail thus causing the access door to strike the person, causing pain and/or injury. Accordingly, it is desirable to provide a system that mitigates the failure of the gas props used to support access doors.

SUMMARY

The present invention may comprise one or more of the features recited in the attached claims, and/or one or more of the following features and combinations thereof.

A support for a gas prop (hydraulic strut) for a vehicle access door includes an elongate sleeve that is positionable around the cylinder and rod of the gas prop. The support secures a weak or otherwise defective gas prop in its position in which the vehicle access door is held open. The elongate sleeve includes a first and second end. The first end of the elongate sleeve is adapted to be selectively positioned between one of two positions: (1) abutting the distal end of the cylinder, and (2) coaxially receiving at least a portion of the length of the cylinder. In the first position the gas prop is held by the support in its extended position, which thereby holds the access door in its open position. In the second position, the gas prop is free to move to its retracted position by the closing of the access door. One or more slots are defined at the second end of the elongate sleeve. Each of the slots is selectively engageable with the shaft or post of an attachment bracket that couples the rod end of the gas prop to the vehicle. Additionally, each one of the slots has a different length, thereby accommodating various lengths of gas props.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which:

FIG. 3A shows the vehicle strut of FIG. 1 prior to the support of FIG. 2 being installed;

FIG. 3B shows the vehicle gas prop of FIG. 1 with the rod end of the gas prop disconnected from its attachment bracket and the gas prop support of FIG. 2 being installed over the gas prop;

FIG. 3C shows the vehicle gas prop of FIG. 1 with the gas prop rod extended from the gas prop cylinder, the access door (not shown) open, and the support of FIG. 2 located around the rod and locking the rod in its extended position;

FIG. 3D shows the vehicle gas prop of FIG. 1 with the access door closed and with the gas prop rod retracted into the gas prop cylinder and the support of FIG. 2 located around a portion of the cylinder;

DESCRIPTION OF THE ILLUSTRATIVE EMBODIMENTS

Figure 1:
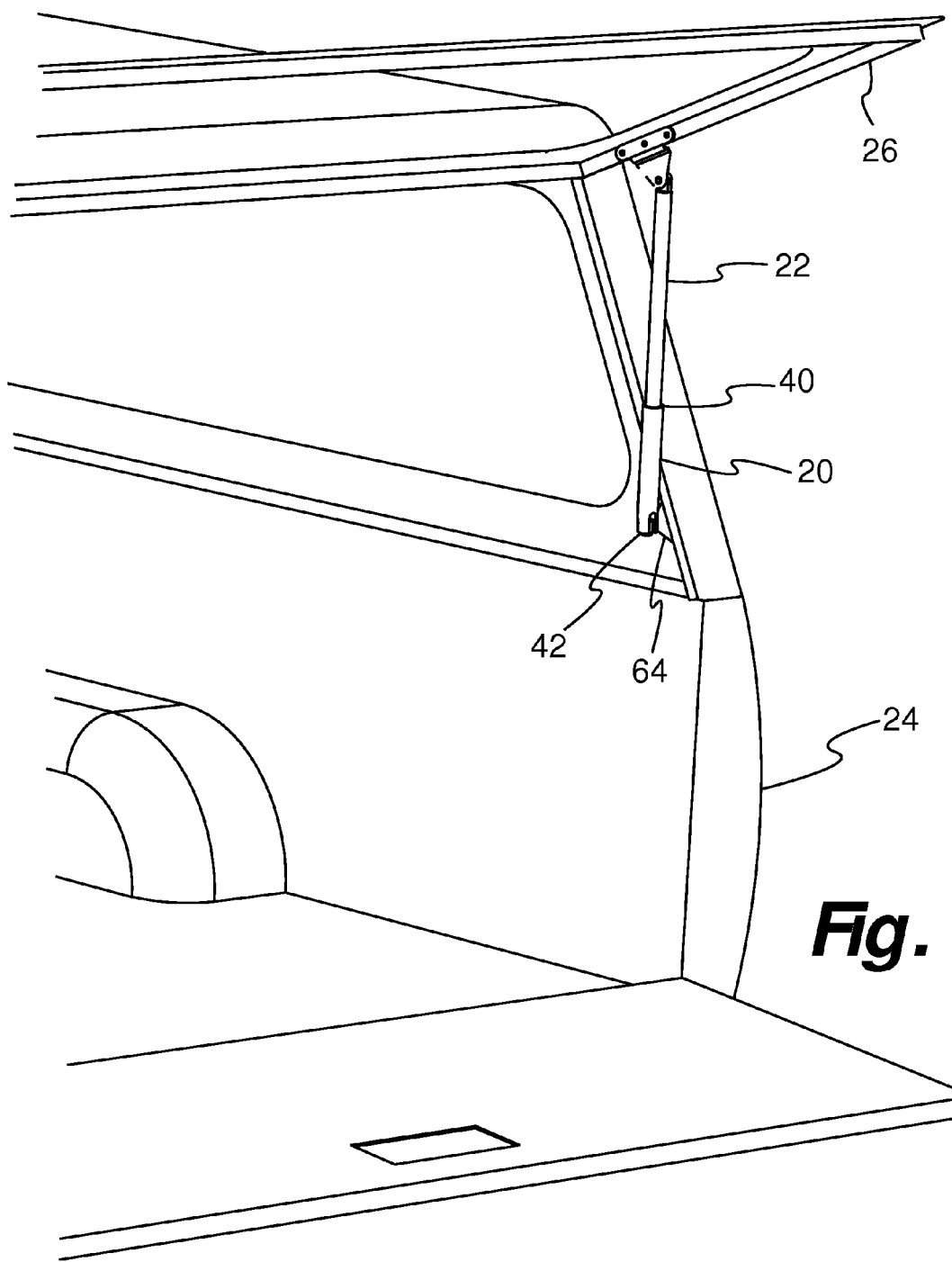
FIG. 1 is a perspective view of an illustrative embodiment of a gas prop support installed on a vehicle gas prop for a vehicle access door according to the present invention.

For the purposes of promoting and understanding the principals of the invention, reference will now be made to one or more illustrative embodiments illustrated in the drawings and specific language will be used to describe the same.

Figure 2:
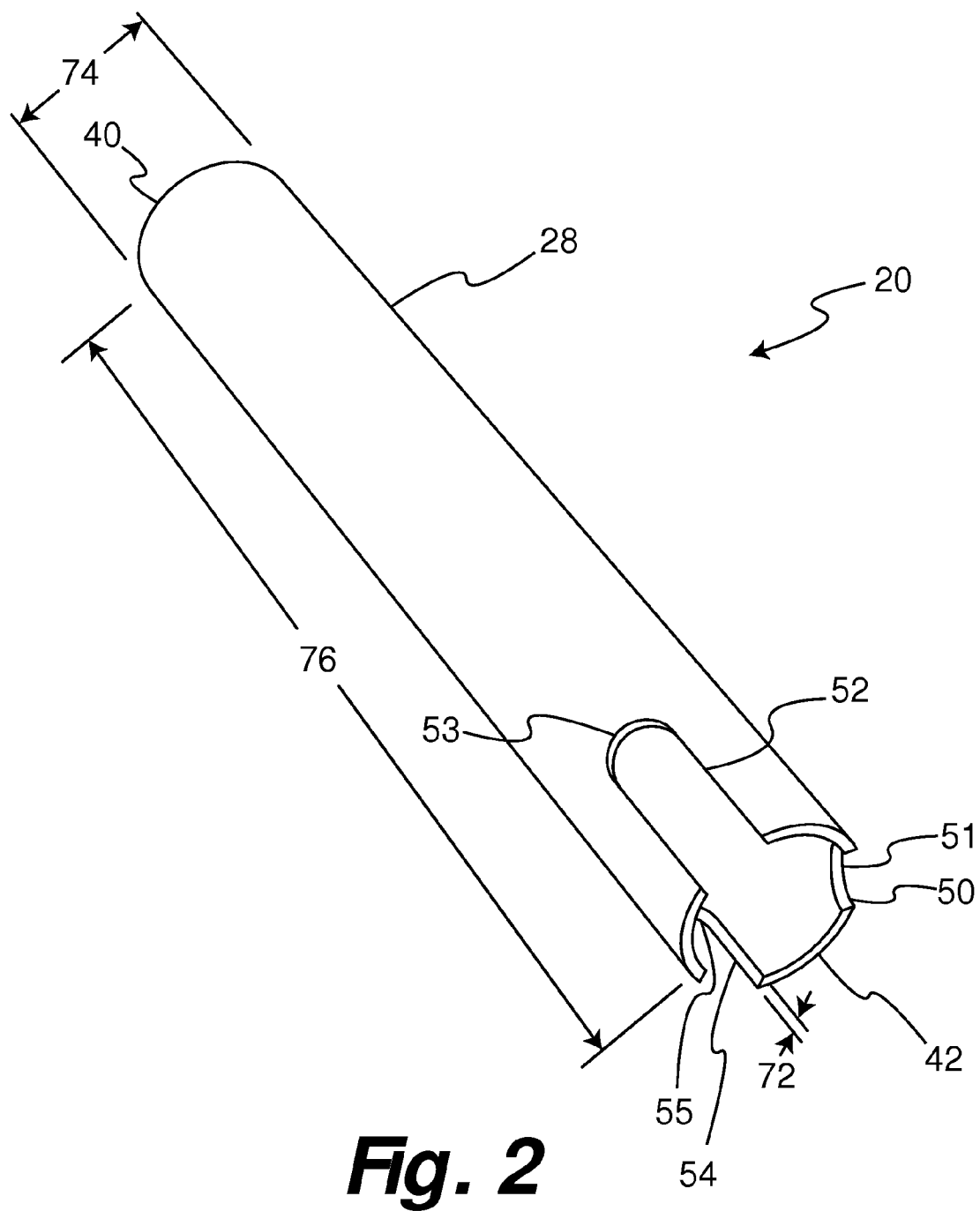
FIG. 2 is a perspective view of the gas prop support of FIG. 1.

Referring to FIGS. 1 and 2, a support 20 for a gas prop (also commonly referred to as a hydraulic strut) 22 for a vehicle's 24 access door 26 includes an elongate sleeve 28 that is positionable around the cylinder 30 and rod 32 of the gas prop 22. The support 20 secures a weak or otherwise defective gas prop 22 in its position in which the vehicle access door 26 is held open (FIG. 1). The elongate sleeve 28 includes a first end 40 and second end 42. The first end 40 of the elongate sleeve 28 is adapted to be selectively positioned between one of two positions. A first position 36 of the support 20 relative to the gas prop 22 locates at least a portion of the first end 40 against the distal end 44 of the cylinder 30, as shown in FIG. 3C. A second position 38 of the support 20 relative to the gas prop 22 provides for the first end 40 coaxially receiving at least a portion 46 (FIG. 3D) of the length of the cylinder 30. In the first position 36 (FIG. 3C) the gas prop 22 is held in its extended position by the support 20, which thereby holds the access door 26 in its open position, as shown in FIG. 1. In the second position 38 (FIG. 3D), the rod 32 of the gas prop 22 is free to move to its retracted position by the closing of the access door 26.

Referring again to FIG. 2, one or more slots 50, 52, 54 are defined at the second end 42 of the elongate sleeve 28. Each of the slots 50, 52, 54 is selectively engageable with the shaft or post 62 of an attachment bracket 64 that couples the rod end 70 (FIG. 3B) of the gas prop 22 to the vehicle 24. Additionally, each one of the slots 50, 52, 54 may have a different length, thereby accommodating various lengths of gas props found on different vehicle access doors.

Still referring to FIG. 2, the elongate sleeve 28 of the support 20 may be made from any material that is sufficiently rigid to retain the weight of a vehicle access door 26. In the illustrative embodiment of support 20, the elongate sleeve 28 is formed from cylindrical aluminum tube stock having about a 0.062 inch wall 72, about a 1.0 inch interior diameter 74, and between about 5.5 and about 6.5 inches in length 76. These approximate dimensions for the wall 72, diameter 74, and length 76 have been discovered to accommodate a large number of specific gas prop 22 and access door 26 combinations on a large number of vehicles 24; however, different materials for the sleeve 28 and different dimensions for the wall 72, interior diameter 74, and length 76 may be utilized depending on the various dimensions of the specific gas prop 22, including the extended and retracted lengths of rod 32 and the outer diameter of cylinder 30 and the compression strength of the sleeve 28 required to support the weight of the vehicle access door 26. For example, the interior diameter 74 of the sleeve 28 is at least slightly greater than the outer diameter of the cylinder 30 of the gas prop 22, and the length 76 of the sleeve 28 is about the length of the rod 32 extending from the cylinder 30 in the extended position 36 shown in FIG. 3C. For example, but not limited to, the wall 72 may vary between about 0.015 and about 0.250 inches, the interior diameter 74 may vary between about 0.5 and about 1.5 inches, and the length 76 may vary between about 4 and about 8 inches.

The first end 40 of the sleeve 28 provides selective engagement with the distal end 44 of the cylinder 30, as shown in FIG. 3C, when the gas prop 22 is in its extended position 36 upon the vehicle access door 26 being opened. The first end 40 of the sleeve 28 can be cut at a 90° angle relative to the elongate axis of the sleeve 28; however, other angles, cuts, shapes, or finishes that facilitate a selectable but sustained engagement of the first end 40 of the sleeve 28 with the distal end 44 of the cylinder 30 can be utilized. For example, a non-slip and/or non-rattle finish, coating, or component can be associated with the first end 40 or any portions of or the entire sleeve 28.

Figure 4:
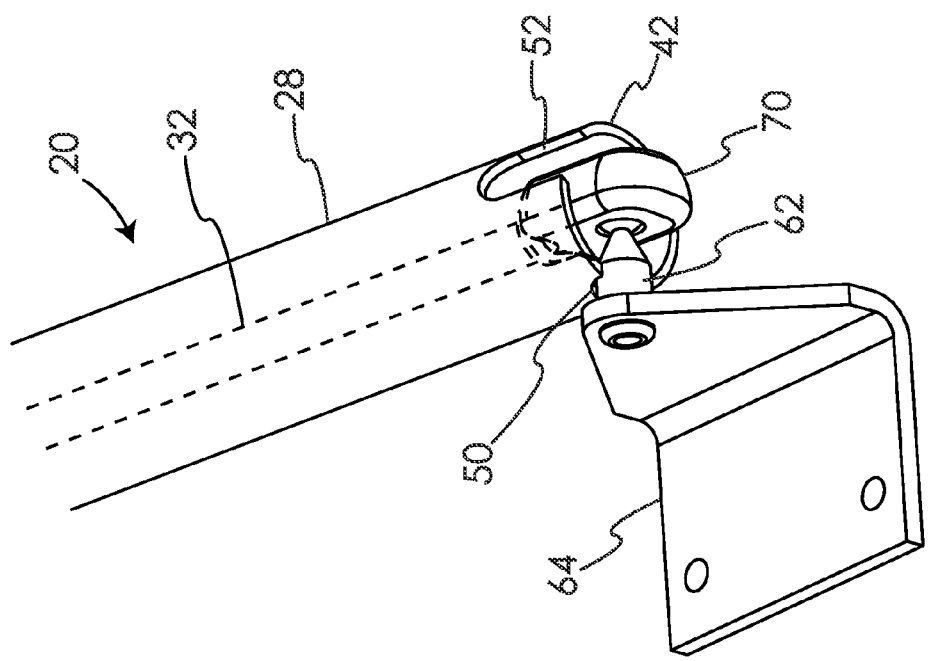
FIG. 4 shows one of the adjustment slots of the gas prop support of FIG. 2 engaged on the ball joint shaft of the lower attachment mount of the vehicle gas prop of FIG. 1.

The illustrative embodiment of the support 20 includes three slots 50, 52, 54 each having a different length defined between the second end 42 of the sleeve 28 and slot end 51, 53, 55, respectively. Each slot 50, 52, 54 provides a selectively engageable feature at the second end 42 of the sleeve 28 with a portion of the gas prop 22. For example, as shown in FIG. 4, any one of the slots 50, 52, 54 may be selectively engaged with the cylindrical post 62 that provides attachment of the rod end 70 with the lower mounting bracket 64. Defining slots 50, 52, 54 of varying lengths or varying in other dimensions or features provides a single support 20 that can accommodate gas props 22 that have different features, for example, but not limited to, different lengths for the rod 32 extending from the cylinder 30 in the extended position 36 as shown in FIG. 3C, or different rod ends 70 or mounting posts 62. In the illustrative embodiment, the lengths of the slots 50, 52, 54 from the second end 42 to the slot ends 51, 53, 55, are about 0.25, 1.0, and 0.5 inches, respectively. While the illustrative embodiment of FIG. 2 includes three slots 50, 52, 54 having uniform widths, slot ends 51, 53, 55 that have a radius, and are defined parallel to the axis of the elongate sleeve 28, slots of a different number, different or non-uniform widths, other slot and features, and other or non-uniform alignments may be included with other embodiments of the support 20.

Referring to FIG. 3A, in operation the access door 26 of the vehicle 24 can be opened, thus moving the rod 32 so that it is fully extended from the cylinder 32. To facilitate installation of the support 20, the rod end 70 is uncoupled from the mounting bracket 64. Referring to FIG. 3B, generally the rod end 70 is coupled to a shaft 62 having a spherical end 80 and is held in place by a spring clip or other mechanism that releaseably retains the rod end 70 on the spherical end 80.

Once the rod end 70 is uncoupled, the support 20 is then placed over the rod 32 that extends from the cylinder 30 of the gas prop 22 and further slid coaxially upward and over at least a portion of the cylinder 30 so that the second end 42 of the support 20 is clear of the rod end 70 as shown in FIG. 3B. As shown in FIGS. 3C and 4, the rod end 70 is now reattached to the shaft 62 and one of the slots 50, 52, 54 is engaged with the post 62 so that the respective one of the slot ends 51, 53, 55 contacts the post 62. It may be necessary to try engaging each one of the slots 50, 52, 54 with the post 62 in order to determine which of the slots 50, 52, 54 provides engagement of a portion of the second end 40 of the support 20 with the distal end 44 of the cylinder 30, as shown in FIG. 3C, upon the vehicle access door 26 being in its open position as shown in FIG. 1.

Upon the correct one of the slots 50, 52, 54 been engaged with the post 62 and the vehicle access door 26 been moved to its maximum open position, the support 20 will generally naturally fall to a position non-coaxial with the rod 32 as long as the first end 40 of the support 20 is in a position below and not around the distal end 44 of the cylinder 30. With the support 20 in this "cocked" position shown in FIG. 3C, the vehicle access door 26 may then be slowly and slightly moved toward a closed position so that the distal end 44 of the cylinder 30 is moved into contact with a portion of the first end 40 of the support 20, thereby locking the gas prop 22 in its extended position 36 and supporting the vehicle door 26 in its open position (FIGS. 1 and 3C).

To close the access door 26, the access door 26 is slowly and slightly moved toward a more open position in order to slightly separate the distal end 44 of the cylinder 30 from the first end 40 of the support 20, thus relieving the pressure exerted along the length of the support 20. While the access door 26 is held in this more open position, the support 20 is simply moved so that it is generally coaxial with the cylinder 30, and as the access door 26 is slowly moved toward a closed position, the first end 40 of the support 20 is guided and slid over the distal end 44 of the cylinder 30. In this position, the rod 32 is able to retract into cylinder 30, thus allowing the access door 26 to fully close as shown in FIG. 3D. Once installed on a vehicle 24, the support 20 may be permanently kept on the gas prop 22, and the above steps subsequent to the installation and illustrated in FIGS. 3C and 3D can be simply repeated upon reopening of the access door 26.

Figure 5:
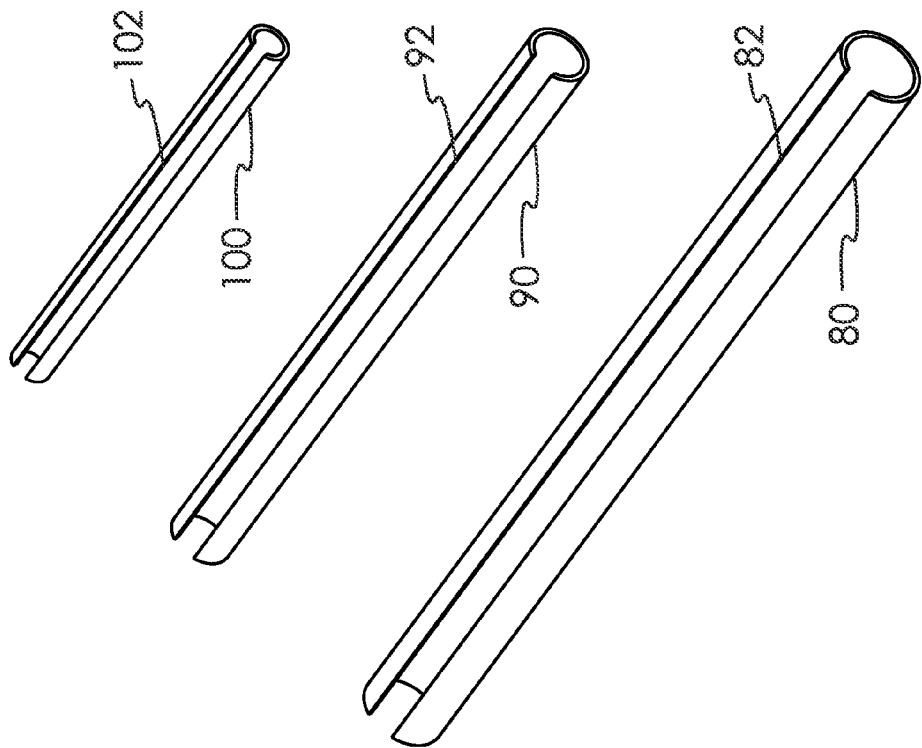
FIG. 5 shows additional illustrative embodiments of the gas prop support according to the present invention.

Alternative embodiments include supports 80, 90, 100 shown in FIG. 5. Each support 80, 90, 100 are elongate sleeves of varying diameters and lengths each having a slot 82, 92, 102 extending the full length of the support 80, 90, 100. The width of each slot 82, 92, 102 is wider than the diameter of the rod 32 of the gas prop 22 it is intended for so that the support 80, 90, 100 can be initially installed without detaching the rod end 708 from the mounting bracket 64. Additionally, each support 80, 90, 100 has a diameter slightly larger than the diameter of cylinder 30 of the gas prop 22 it is intended for, so that in operation, supports 80, 90, 100 can function as described above for the support 20.

Because there are a wide variety of vehicles and sizes of and gas props to keep them open, which may vary in size, one aspect of the invention includes a variety of support struts of varying sizes. For example, supports 82, 92, 102 may be provided that are about 4 or more inches in length, including about 6, 12, 14, 16 and 18 inches in length, and which have inside diameters of about 0.75, 1, and 1.125 inches respectively. In addition, the slots 82, 92, 102 along the length of the supports 20, 90, 100 may be from about 0.25 to about 0.5 inches wide. The supports 82, 92, 102 may also include one or more slots 50, 53, 55 (not shown) as provided with support 20 described above.

Those with skill in the art will appreciate that the supports 20, 80, 90, 100 of the present invention may be utilized regardless of the orientation of the gas prop 22 on the vehicle 24. In other words, some vehicles 24 are configured so that the cylinder 30 is attached to the access door 26, and the rod 32 is attached to the vehicle body. This is the configuration shown in FIG. 1. However, other vehicles 24 are constructed so that the cylinder 30 is attached to the vehicle body, and the rod 32 extends upward for connection to the access door 26. The supports 20, 80, 90, 100 of the present invention can be used with either configuration. Although the supports 20, 80, 90, 100 disclosed herein are cylindrical in cross section, they may be of any cross section, including triangular, oval, or rectangle.

In an alternate embodiment, the slots 50, 52, 54, 82, 92, 102 may be eliminated from the supports 20, 80, 90, 100. In this embodiment, the supports 20, 80, 90, 100 comprise essentially a tube, (although it need not be circular in cross section).

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the following claims are desired to be protected.

The invention claimed is:

1. A support for a vehicle gas prop, the gas prop having a cylinder, a rod extendable from a distal end of the cylinder, and a mounting device for coupling a distal end of the rod to the vehicle, the support comprising:
   an elongate sleeve having a first and second end and having an interior diameter greater than the outer diameter of the first end of the cylinder; and
   a plurality of slots defined at a second end of the elongate sleeve, each one of the plurality of slots having a different length; and
   wherein each one of the plurality of slots are adapted to directly engage at least a portion of the mounting device.

2. The support of claim 1, further comprising an anti-rattle member.

3. The support of claim 2, wherein the anti-rattle member comprises a coating.

4. The support of claim 1, wherein the first end of the elongate sleeve is adapted to selectively coaxially receive at least a portion of the length of the distal end of the cylinder.

5. The support of claim 1, wherein the first end of the elongate sleeve is adapted to selectively abut the distal end of the cylinder.

6. The support of claim 1, wherein the length of the elongate sleeve is between about 5½ inches and 6½ inches.

7. The support of claim 1, wherein the interior diameter of the elongate sleeve is about 1 inch.

8. The support of claim 1, wherein the plurality of slots includes slots having a length of about ¼ inch, about ½ inch, and about 1 inch.

9. In Combination,
   a vehicle gas prop having a cylinder and a rod, the rod having a retracted and an extended position; and
   an elongate sleeve adapted to be slideably positionable around substantially the entire length of the rod upon the rod positioned in the extended position;
   the elongate sleeve is further adapted to be slideably positionable such that a first end of the elongate sleeve directly abuts against a distal end of the cylinder; and
   the elongate sleeve includes a plurality of slots defined at an end of the elongate sleeve, each one of the plurality of slots having a different length.

10. The combination of claim 9, wherein each one of the plurality of slots are adapted to engage at least a portion of a mounting device for a distal end of the extendable rod.

11. The combination of claim 9, wherein the elongate sleeve defines a slot along its entire length, the slot having a width greater than the diameter of the rod and less than the diameter of the cylinder.

12. The support of claim 9, wherein the first end of the elongate sleeve is adapted to selectively coaxially receive at least a portion of the length of the distal end of the cylinder.

13. The combination of claim 9, wherein the elongate sleeve includes an interior diameter greater than the outer diameter of the cylinder.

14. A method for holding open a vehicle access door having a gas prop, the gas prop comprising a cylinder, an extendable rod, and a mounting device for securing an end of the rod to the vehicle, the method comprising the steps of:
   opening the vehicle access door to its open position to thereby extend the rod from the cylinder;
   placing a support over the rod, the support comprising an elongate sleeve having a first and second end, having an interior diameter greater than the outer diameter of the cylinder, and having a plurality of slots defined at a second end of the elongate sleeve, each one of the plurality of slots having a different feature;
   abutting the first end of the sleeve directly against an end of the cylinder from which the rod extends; and
   engaging one of the plurality of slots with at least one of the rod and the mounting device for the rod.

15. The method of claim 14, wherein each one of the plurality of slots includes a different length and the engaging step includes engaging one of the plurality of slots on a shaft portion of the mounting device.

* * * * *